(12) United States Patent
Chen et al.

(10) Patent No.: US 9,164,948 B2
(45) Date of Patent: Oct. 20, 2015

(54) ELECTRONIC CALCULATOR AND CONTROL METHOD THEREOF

(71) Applicant: Kinpo Electronics, Inc., New Taipei (TW)

(72) Inventors: Ming-Chih Chen, New Taipei (TW); Chin-Heng Tai, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 327 days.

(21) Appl. No.: 13/950,300

(22) Filed: Jul. 25, 2013

(65) Prior Publication Data

US 2014/0330877 A1    Nov. 6, 2014

(30) Foreign Application Priority Data

May 6, 2013   (TW) .............................. 102116117 A

(51) Int. Cl.
*G06F 15/02*    (2006.01)
(52) U.S. Cl.
CPC ..................................... *G06F 15/02* (2013.01)
(58) Field of Classification Search
None
See application file for complete search history.

(56) References Cited

U.S. PATENT DOCUMENTS

| | | | |
|---|---|---|---|
| 4,080,659 A | | 3/1978 | Francini |
| 5,732,001 A | * | 3/1998 | Nakayama et al. ............ 708/162 |
| 7,272,621 B2 | * | 9/2007 | de Brebisson ................. 708/131 |
| 2005/0132162 A1 | | 6/2005 | Reese et al. |
| 2008/0244255 A1 | | 10/2008 | Chen et al. |
| 2011/0143809 A1 | * | 6/2011 | Salomone et al. .......... 455/550.1 |
| 2012/0124112 A1 | * | 5/2012 | Goldhaber ...................... 708/132 |
| 2014/0330877 A1 | * | 11/2014 | Chen et al. ..................... 708/130 |

FOREIGN PATENT DOCUMENTS

| | | |
|---|---|---|
| TW | 576596 | 2/2004 |
| TW | 586660 | 5/2004 |
| TW | 200407787 | 5/2004 |
| TW | I297828 | 6/2008 |
| TW | 200947203 | 11/2009 |

OTHER PUBLICATIONS

"Office Action of Taiwan Counterpart Application," issued on Feb. 24, 2015, p. 1-p. 9.

* cited by examiner

*Primary Examiner* — David H Malzahn
(74) *Attorney, Agent, or Firm* — Jianq Chyun IP Office

(57) ABSTRACT

An electronic calculator and a control method thereof are provided. The electronic calculator includes a display module, a key array, and a processing chip. The key array includes a plurality of keys. The keys include at least a turn-on key. The turn-on key has a first hardware configuration and a second hardware configuration. The processing chip detects the triggering of the keys to execute corresponding calculation functions and control image display of the display module. The electronic calculator enters a turned-on state in response to the triggering of the turn-on key. When the turn-on key is triggered, the processing chip controls the electronic calculator to keep or clear an operation information stored before the electronic calculator is turned off according to whether the turn-on key is set to the first hardware configuration or the second hardware configuration.

13 Claims, 4 Drawing Sheets

ELECTRONIC CALCULATOR AND CONTROL METHOD THEREOF

CROSS-REFERENCE TO RELATED APPLICATION

This application claims the priority benefit of Taiwan application serial no. 102116117, filed on May 6, 2013. The entirety of the above-mentioned patent application is hereby incorporated by reference herein and made a part of this specification.

BACKGROUND OF THE INVENTION

1. Field of the Invention

The present invention generally relates to an electronic calculator and a control method thereof, and more particularly, to an electronic calculator which selectively works in two different operation modes and a control method thereof.

2. Description of Related Art

Electronic calculators offer very convenient and fast calculation functions. Thus, electronic calculators are used in many aspects of our daily life, such as shopping, accounting, mathematical, or engineering applications, to carry out simple mathematical calculations or even calculations of complicated formulae.

Electronic calculators having different functions and specifications are usually designed according to the purposes and users of the electronic calculators. For example, regarding a personal electronic calculator, for the convenience of the user, operation information (for example, operation information stored by using the M+ key or the M- key) stored in the electronic calculator should be retained after the electronic calculator is turned off. On the other hand, regarding an electronic calculator used in an office or company or an electronic calculator for examination purpose, the previously stored operation information should be cleared every time when the electronic calculator is turned off, so as to ensure the security of the information or the fairness of an examination.

Even though a professional calculator manufacturer can manufacture aforementioned two different types of electronic calculators by using similar manufacturing processes, the calculator manufacturer still needs to change the design of the processing chips in the electronic calculators in order to allow the electronic calculators to have corresponding functions. Not only it is inconvenient to manufacture two different types of processing chips, but the management of the manufacturing cost and product inventory is made very troublesome.

SUMMARY OF THE INVENTION

Accordingly, the present invention is directed to an electronic calculator and a control method thereof, in which both a function of storing an operation information and a function of removing the operation information when the electronic calculator is turned off are provided, so that a designer can selectively use the two functions according to the actual requirement.

The present invention provides an electronic calculator. The electronic calculator includes a display module, a key array, and a processing chip. The key array has a plurality of keys. The keys at least include a turn-on key. The turn-on key has a first hardware configuration and a second hardware configuration. The processing chip is coupled to the display module and the key array. The processing chip detects whether the keys are triggered to execute corresponding calculation functions and control the image display of the display module. The electronic calculator enters a turned-on state in response to the triggering of the turn-on key. If the turn-on key is set to the first hardware configuration, the processing chip controls the electronic calculator to keep an operation information stored before the electronic calculator is turned off when the turn-on key is triggered. If the turn-on key is set to the second hardware configuration, the processing chip controls the electronic calculator to clear the operation information stored before the electronic calculator is turned off when the turn-on key is triggered.

The present invention provides a control method of an electronic calculator. The control method includes following steps. A turn-on key is set to a first hardware configuration or a second hardware configuration. Whether the turn-on key is triggered is detected. If the turn-on key is set to the first hardware configuration, when the turn-on key is triggered, the electronic calculator is controlled to enter a turned-on state, and an operation information stored before the electronic calculator is turned off is kept. If the turn-on key is set to the second hardware configuration, when the turn-on key is triggered, the electronic calculator is controlled to enter the turned-on state, and the operation information stored before the electronic calculator is turned off is cleared. In the turned-on state, corresponding calculation functions are executed and the image display of a display module is controlled in response to the triggering of a plurality of keys.

As described above, an electronic calculator and a control method thereof are provided by embodiments of the present invention. A turn-on key of the electronic calculator has two different hardware configurations, and a processing chip can start two different operation modes in which an operation information stored before the electronic calculator is turned off is respectively kept and cleared according to the hardware configuration of the turn-on key. Because two different operation modes of the electronic calculator can be accomplished without changing the processing chip but by simply changing the hardware configuration of the turn-on key, a designer can quickly design an electronic calculator offering a memory saving mode or a memory clearing mode according to the requirement of the product specification, so that the manufacturing of electronic calculators is made very convenient.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
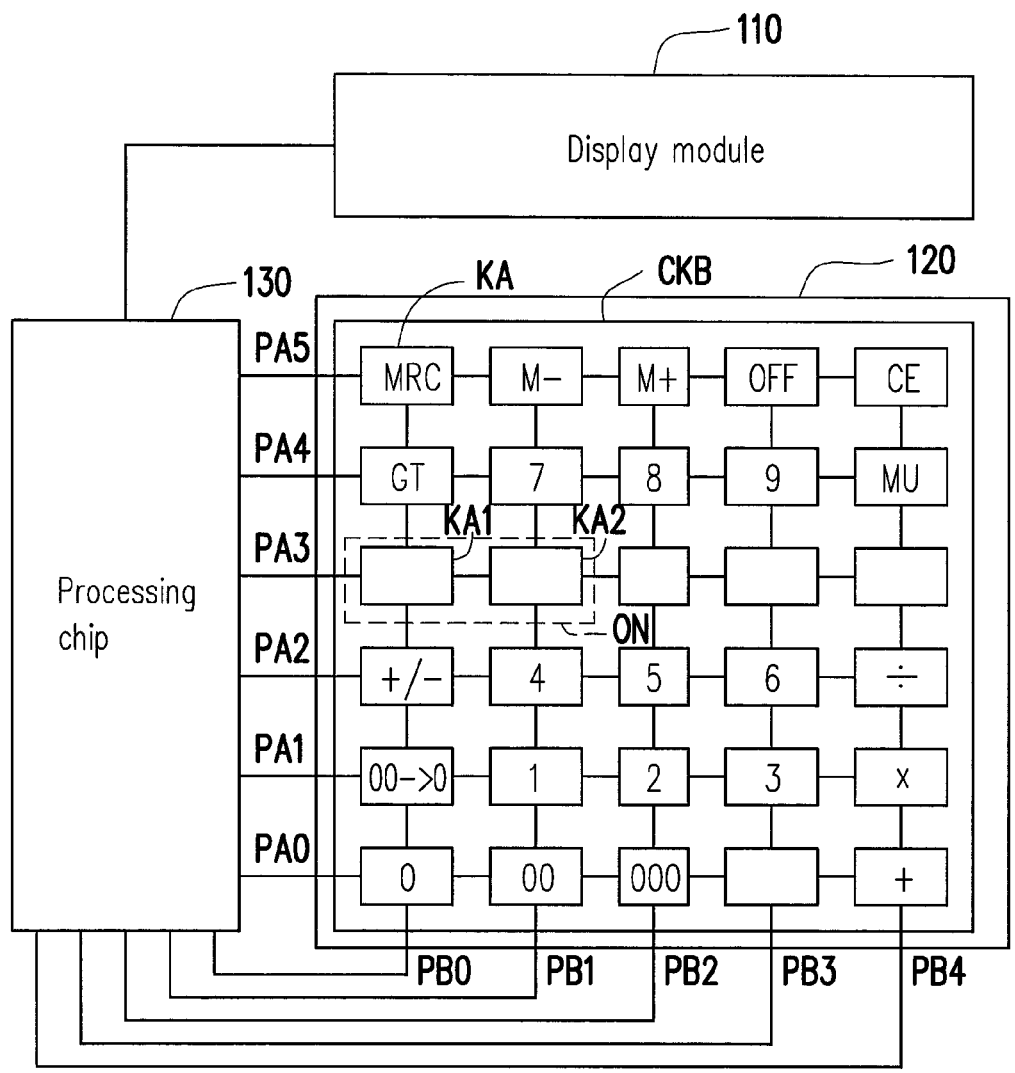
FIG. 1 is a diagram of an electronic calculator according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of an electronic calculator according to an embodiment of the present invention. Referring to FIG. 1, the electronic calculator 100 includes a display module 110, a key array 120, and a processing chip 130. The key array 120 has a plurality of keys (for example, a turn-on key ON, a turn-off key, number keys 1-9, and function keys M+, M−, MRC, MU, GT, CE, +, ×, ÷, ., √, OFF, +/−, and 00->0, etc). The processing chip 130 is coupled to the display module 110 and the key array 120. The processing chip 130 detects whether the keys on the key array 120 are triggered (i.e., pressed by a user) so as to execute current calculation functions and control the image display of the display module 110.

For example, when the processing chip 130 detects that the turn-on key ON is triggered, the processing chip 130 controls the electronic calculator 100 to enter a turned-on state. When the electronic calculator 100 is in the turned-on state, the processing chip 130 detects whether the number keys (for example, 1-9) and function keys (for example, M+, M−, and MRC, etc) are triggered, so as to carry out corresponding calculations and display the calculation results on the display module 110.

In the present embodiment, the key array 120 includes a circuit board CKB. The circuit board CKB includes a plurality of key areas KA (5×6 key areas will be taken as an example thereinafter) arranged into an array, a plurality of input ports PA0-PA5, and a plurality of output ports PB0-PB4. The processing chip 130 is respectively coupled to each row of the key areas KA through the input ports PA0-PA5 and respectively coupled to each column of the key areas KA through the output ports PB0-PB4. The keys of the key array 120 are respectively corresponding to the key areas KA on the circuit board (except the turn-on key ON, which will be explained in following embodiments), so that a user can trigger a key area KA by pressing a corresponding key.

To be specific, each key area KA receives a scan signal from the processing chip 130 through the corresponding one of the input port PA0-PA5 and generates a corresponding output signal when the corresponding key is trigger. Thus, the processing chip 130 can determine whether each key is triggered according to the output signal received from the corresponding one of the output ports PB0-PB4 and execute a function corresponding to the triggered key accordingly. In a real application, when the keys are not triggered, the key areas KA are preset as open circuits (i.e., the corresponding input ports PA0-PA5 and output ports PB0-PB4 are electrically separated from each other). When a key is triggered, the corresponding key area KA is turned on by a key pad so that the corresponding input port and output port are electrically connected with each other. In this case, the scan signal provided by the processing chip 130 is sent back to the processing chip 130 through the turned-on key area, so that the processing chip 130 can determine which key is triggered/pressed accordingly. In other words, the processing chip 130 determines whether a key is triggered by detecting the on/off state of the corresponding key area KA on the circuit board CKB.

In the key array 120 of the present embodiment, the turn-on key ON is corresponding to two key areas KA1 and KA2. The turn-on key ON has two different hardware configurations according to the circuit layout of the key areas KA1 and KA2. Thus, a designer can set the hardware configuration of the turn-on key ON according to the requirement of product specifications, so that the processing chip 130 can set the operation mode of the electronic calculator 100 according to different hardware configuration settings. For example, the first hardware configuration of the turn-on key ON is corresponding to that the key area KA1 is turned on in response to the triggering of the turn-on key ON while the key area KA2 is not turned on in response to the triggering of the turn-on key ON. Contrarily, the second hardware configuration of the turn-on key ON is corresponding to that the key area KA2 is turned on in response to the triggering of the turn-on key ON while the key area KA1 is not turned on in response to the triggering of the turn-on key ON.

Regardless of whether the turn-on key ON is set to the first hardware configuration or the second hardware configuration, the electronic calculator 100 is turned on and enters a turned-on state in response to the triggering of the turn-on key ON. Taking aforementioned first hardware configuration and second hardware configuration as an example, if the turn-on key ON is set to the first hardware configuration, when the turn-on key ON is triggered, the processing chip 130 starts a memory saving mode to control the electronic calculator 100 to keep the operation information stored before the electronic calculator 100 is turned off (i.e., the operation information stored when last time the electronic calculator 100 is in the turned-on state). Contrarily, if the turn-on key ON is set to the second hardware configuration, when the turn-on key ON is triggered, the processing chip 130 starts a memory clearing mode to control the electronic calculator 100 to clear the operation information stored before the electronic calculator 100 is turned off. In the present embodiment, the function of storing the operation information can be realized through the storage function key M+, M−, or MRC, where when the storage function key M+, M−, or MRC is triggered in the turned-on state, the processing chip 130 controls the electronic calculator 100 to store the current operation information.

To be specific, when the electronic calculator 100 is in the turned-on state and the processing chip 130 detects that none of the keys in the key array 120 is triggered during a predetermined time, the processing chip 130 automatically powers off the electronic calculator 100. This function is usually referred to as auto power off (APO). Aforementioned predetermined time can be defined by the designer and is not limited in the present invention. On the other hand, a user can turn on a corresponding key area KA by pressing the turn-off key OFF, and when the key area KA corresponding to the turn-off key OFF is turned on in the turned-on state, the processing chip 130 powers off the electronic calculator 100.

When the electronic calculator 100 satisfies one of the two turn-off conditions (i.e., no key is triggered during the predetermined time and the turn-off key OFF is pressed) described above, the electronic calculator 100 enters a turned-off state from the turned-on state. In the turned-off state, the processing chip 130 disables the functions corresponding to all key areas KA except the first key area KA1 and the second key area KA2 and controls the display module 110 to stop displaying any image.

In this case, if the turn-on key ON is set to the first hardware configuration, the processing chip 130 controls the electronic calculator 100 to enter the turned-on state from the turned-off state again and starts the memory saving mode when the turn-on key ON is triggered. In the electronic calculator 100 working in the memory saving mode, regardless of the state (the turned-on state or the turned-off state) of the electronic calculator 100, the operation information stored by the electronic calculator 100 in the turned-on state (for example, operation information stored by using the function key M+ or M−) is always stored in the electronic calculator 100. In other words, in this operation mode, even if the electronic calculator 100 is turned off, the user can still read the previously stored operation information when next time the electronic calculator 100 is turned on.

On the other hand, if the turn-on key ON is set to the second hardware configuration, when the turn-on key ON is triggered, the processing chip 130 controls the electronic calculator 100 to enter the turned-on state from the turned-off state again and starts the memory clearing mode. In the electronic calculator 100 working in the memory clearing mode, the operation information stored in the turned-on state is removed from the electronic calculator 100 as long as the state of the electronic calculator 100 changes (from turned-on state to turned-off state or from turned-off state to turned-on state). In other words, in this operation mode, once the electronic calculator 100 is turned off, the user cannot read the previously stored operation information when next time the electronic calculator 100 is turned on.

It should be noted that to clarify the drawing, the physical structure of each key in the key array 120 is not illustrated in FIG. 1. Instead, corresponding key areas KA are marked with symbols (for example, ON, OFF, 1-9, M+, M−, MRC, MU, GT, CE, +, ×, ÷, ., √, OFF, +/−, and 00->0) familiar to those having ordinary knowledge in the art to represent the physical keys corresponding to these key areas KA. However, those having ordinary knowledge in the art should be able to understand the physical appearance and internal circuit to be presented by the present embodiment by referring to the key array 120 illustrated in FIG. 1.

Additionally, the functions of the keys illustrated in FIG. 1 are only examples used for describing the present embodiment but not intended to limit the functions of the electronic calculator 100 or the arrangement of the key areas KA. In other embodiments, the row number and column number of the key array 120 in the electronic calculator 100 may be adjusted according to the design requirement to increase the number of keys, and functions such as sin, cos, tan, sin-1, cos-1, tan-1, log, ln, π, and EXP can be assigned to the added keys. However, the present invention is not limited thereto.

Moreover, it should be understood by those having ordinary knowledge in the art that to realize the storage function of the electronic calculator 100 in the present embodiment, the electronic calculator 100 further includes a memory unit (not shown) for storing the operation information. The memory unit can be integrally disposed in the processing chip 130 or independently disposed in the electronic calculator 100. However, the present invention is not limited thereto.

Figure 2:
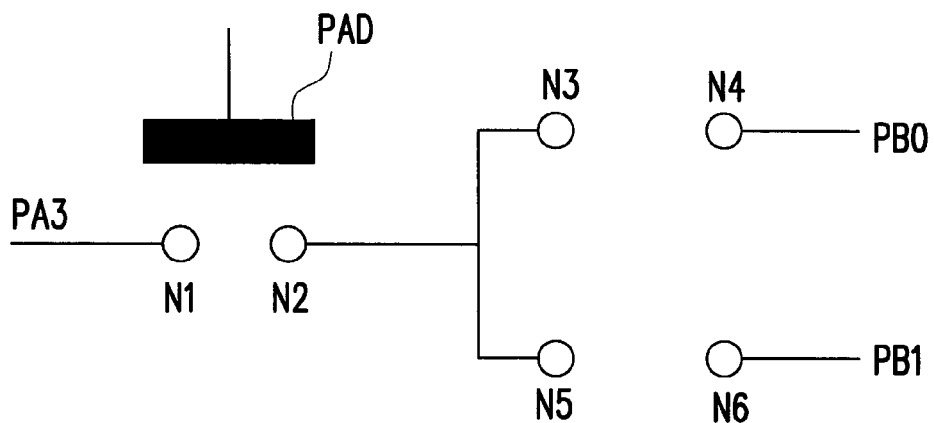
FIG. 2 is diagram illustrating the circuit structure of a turn-on key according to an embodiment of the present invention.

FIG. 2 is diagram illustrating the circuit structure of a turn-on key according to an embodiment of the present invention. Referring to both FIG. 1 and FIG. 2, in the present embodiment, the key area KA1 is composed by the nodes N1, N2, N3, and N4 and the corresponding circuits, and the key area KA2 is composed by the nodes N1, N2, N5, and N6 and the corresponding circuits, where the key pad PAD short-circuits the nodes N1 and N2 when a user presses the turn-on key ON.

In the circuit structure of the turn-on key ON, the connection between the nodes N3 and N4 and the connection between the nodes N5 and N6 determine the hardware configuration of the turn-on key ON. In other words, the hardware configuration of the turn-on key ON can be set, so as to selectively start different operation mode, by short-circuiting the nodes N3 and N4 or short-circuiting the nodes N5 and N6.

For example, if a designer is about to design a electronic calculator 100 in the memory saving mode, the designer can set the hardware configuration of the turn-on key ON by short-circuiting the nodes N3 and N4 and keeping the open-circuit between the nodes N5 and N6. With such a hardware configuration, when the turn-on key ON is triggered, the input port PA3 is electrically connected with the output port PB0 through the first key area KA1, and the output port PB1 corresponding to the second key area KA2 is electrically separated from the input port PA3. In this case, a scan signal provided by the processing chip 130 is sent back to the processing chip 130 through the transmission path from the input port PA3 to the output port PB0, so that the processing chip 130 controls the electronic calculator 100 to enter the turned-on state and starts the memory saving mode.

On the other hand, if the designer is about to design an electronic calculator 100 in the memory clearing mode, the designer can set the hardware configuration of the turn-on key ON by short-circuiting the nodes N5 and N6 and keeping the open-circuit between the nodes N3 and N4. With such a hardware configuration, when the turn-on key ON is triggered, the input port PA3 is electrically connected with the output port PB1 through the second key area KA2, and the output port PB0 corresponding to the first key area KA1 is electrically separated from the input port PA3. In this case, a scan signal provided by the processing chip 130 is sent back to the processing chip through the transmission path from the input port PA3 to the output port PB1, so that the processing chip 130 controls the electronic calculator 100 to enter the turned-on state and starts the memory clearing mode.

In conventional designs of electronic calculators, if an electronic calculator is set to the memory saving mode, it cannot be changed to the memory clearing mode, and vice versa. To change the operation mode of an electronic calculator, the processing chip of the electronic calculator has to be re-designed. In other words, processing chips for different operation modes cannot be combined in a conventional electronic calculator structure.

While in the electronic calculator 100 provided by the present embodiment, the circuit layouts of the key areas KA1 and KA2 can be adjusted and the hardware configuration of the turn-on key ON can be changed through soldering/desoldering or a similar hardware circuit implementation. Thus, a designer needs not to replace or re-design the processing chip 130 and can realize a control mechanism of selectively starting different operation modes according to the requirement of the product specifications by simply adjusting the hardware configuration of the turn-on key ON.

Figure 3:
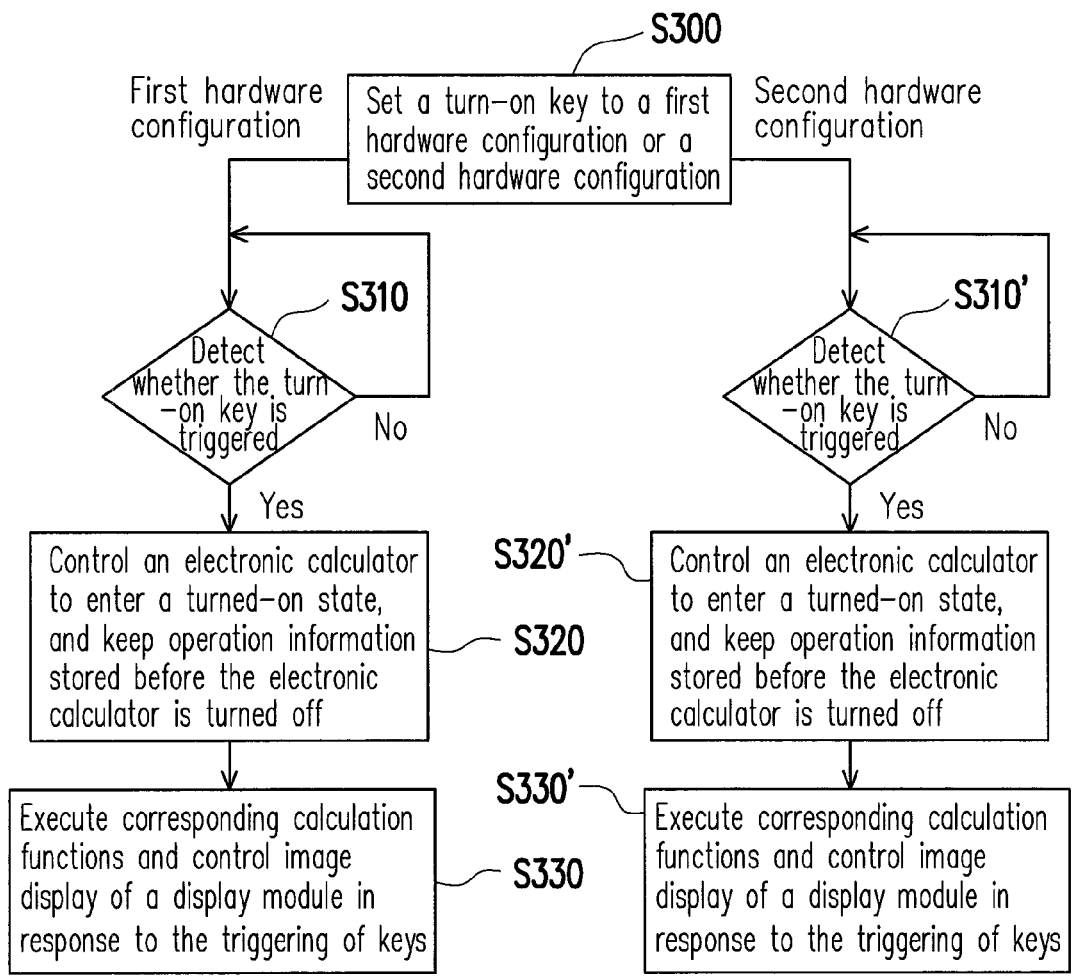
FIG. 3 is a flowchart of a control method of an electronic calculator according to an embodiment of the present invention.

FIG. 3 is a flowchart of a control method of an electronic calculator according to an embodiment of the present invention. The control method in the present embodiment is adapted to the electronic calculator 100 illustrated in FIG. 1. The electronic calculator includes a key array (for example, the key array 120) having a plurality of keys and a display module (for example, the display module 110). The key array at least includes a turn-on key. The turn-on key has a first hardware configuration and a second hardware configuration.

Referring to FIG. 3, the control method includes following steps. First, the turn-on key is set to the first hardware configuration or the second hardware configuration (step S300). If the turn-on key is set to the first hardware configuration, whether the turn-on key is triggered is detected (step S310). When the turn-on key is triggered, the electronic calculator is controlled to enter a turned-on state, and an operation information stored before the electronic calculator is turned off is kept (step S320). In the turned-on state, corresponding calculation functions are executed and the image display of the display module is controlled in response to the triggering of the keys (step S330). If the turn-on key is set to the second hardware configuration, whether the turn-on key is triggered is detected (step S310'). When the turn-on key is triggered, the electronic calculator is controlled to enter a turned-on state, and the operation information stored before the electronic calculator is turned off is cleared (step S320'). In the turned-on state, corresponding calculation functions are executed and the image display of the display module is controlled in response to the triggering of the keys (step S330').

Figure 4:
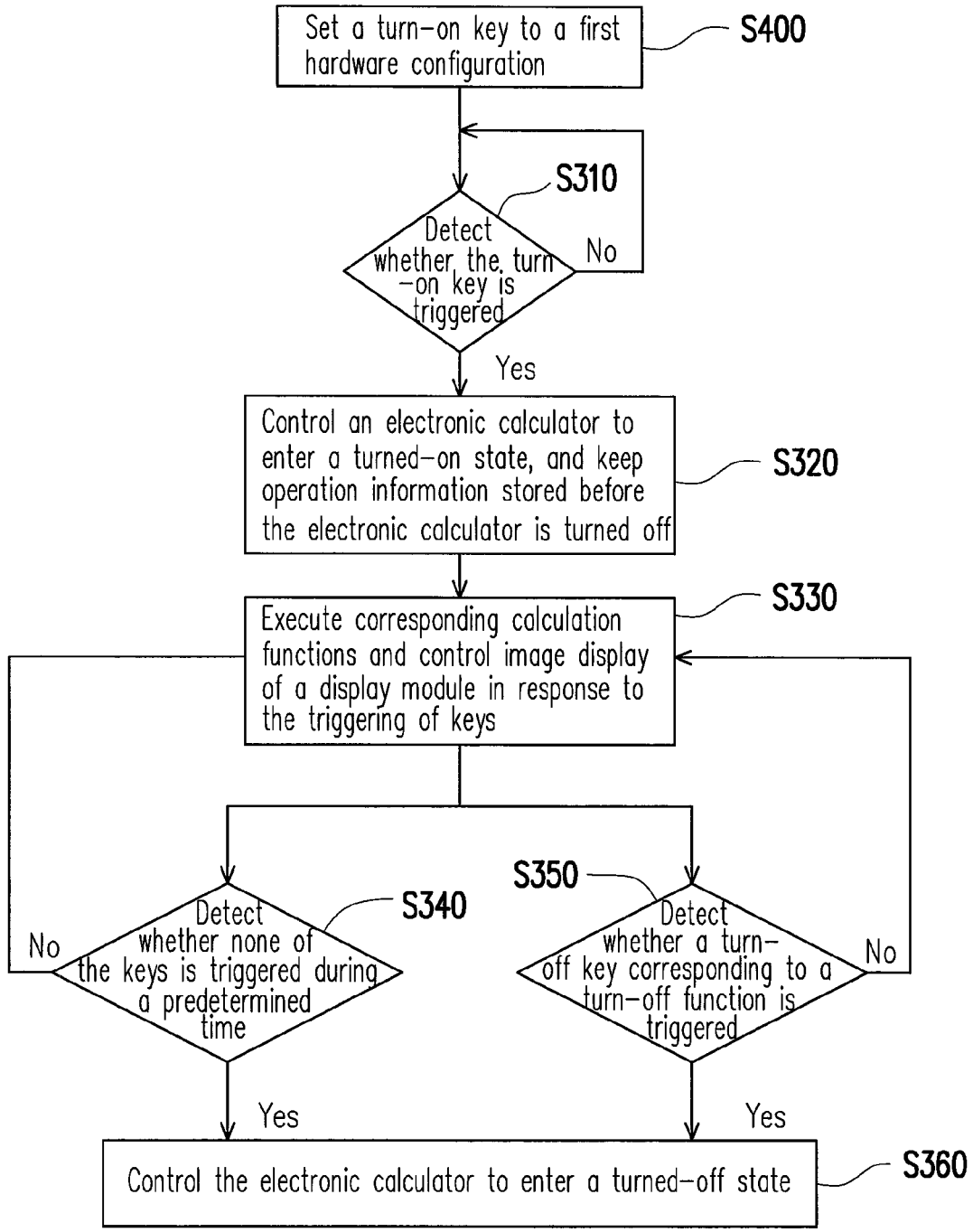
FIG. 4 is a flowchart of a control method of an electronic calculator according to another embodiment of the present invention.

FIG. 4 is a flowchart of a control method of an electronic calculator according to another embodiment of the present invention. The present embodiment is an actual implementation of the embodiment illustrated in FIG. 3. Referring to FIG. 4, in the procedure of the present embodiment, if the turn-on key is set to the first hardware configuration (step S400), first, whether the turn-on key is triggered is detected (step S310). If the turn-on key is triggered, the electronic calculator is controlled to enter the turned-on state, and the operation information stored before the electronic calculator is turned off is kept (step S320). In the turned-on state, the electronic calculator executes corresponding calculation functions and controls the image display of the display module in response to the triggering of the keys (step S330), detects whether at least one of the keys is triggered during a predetermined time (step S340), and detects whether a turn-off key corresponding to a turn-off function is triggered (step S350). If none of the keys is triggered during the predetermined time (step S340) or the turn-off key is triggered (step S350), the electronic calculator is controlled to enter a turned-off state (step S360). Contrarily, if at least one of the keys is triggered during the predetermined time (step S340) and the turn-off key is not triggered (step S350), step S330 is executed again.

Figure 5:
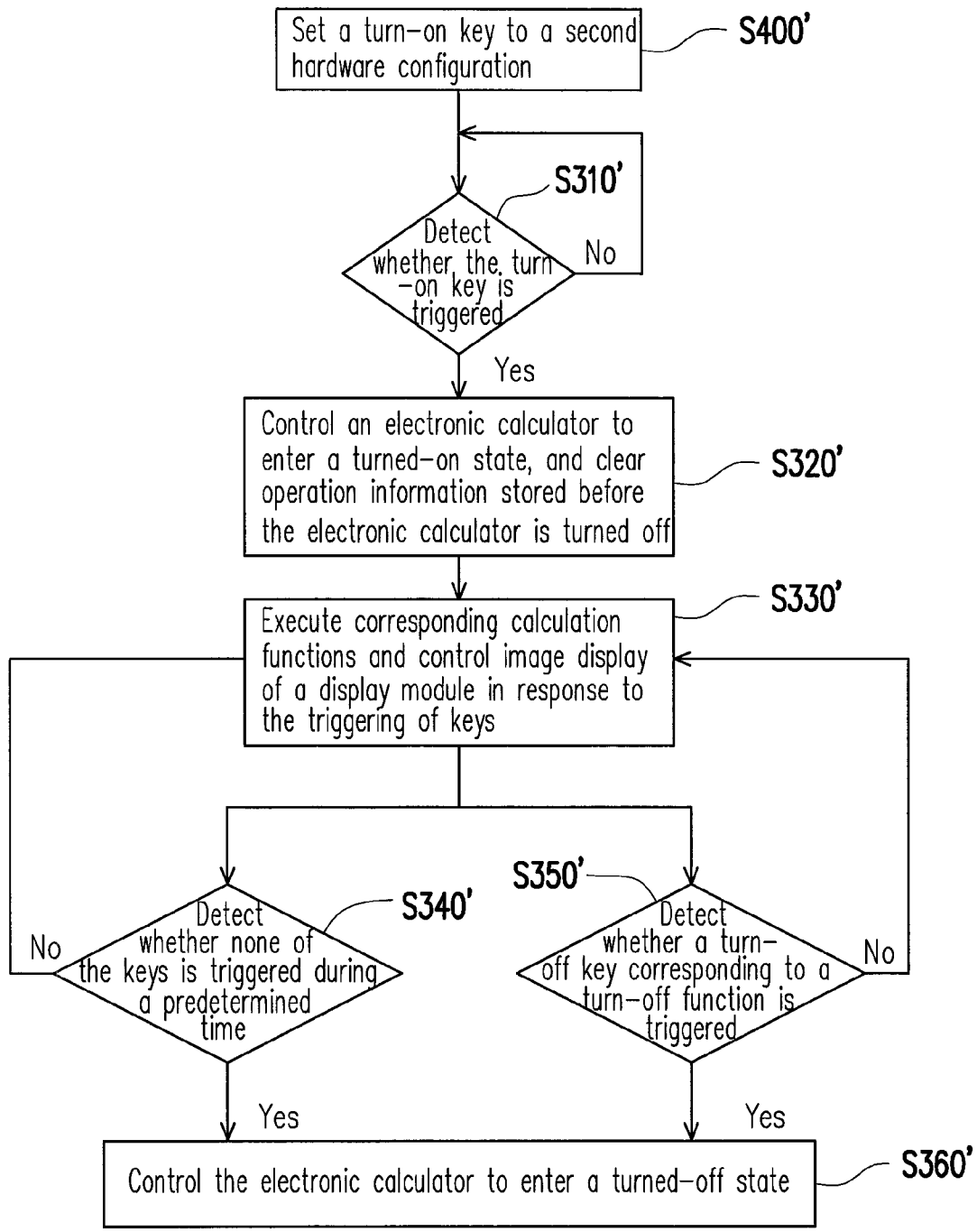
FIG. 5 is a flowchart of a control method of an electronic calculator according to yet another embodiment of the present invention.

FIG. 5 is a flowchart of a control method of an electronic calculator according to yet another embodiment of the present invention. The present embodiment is another actual implementation of the embodiment illustrated in FIG. 3. Referring to FIG. 5, in the procedure of the present embodiment, if the turn-on key is set to the second hardware configuration (step S400'), first, whether the turn-on key is triggered is detected (step S310'). If the turn-on key is triggered, the electronic calculator is controlled to enter the turned-on state, and the operation information stored before the electronic calculator is turned off is cleared (step S320'). In the turned-on state, the electronic calculator executes corresponding calculation functions and controls the image display of the display module in response to the triggering of the keys (step S330')', detects whether at least one of the keys is triggered during a predetermined time (step S340'), and detects whether the turn-off key corresponding to the turn-off function is triggered (step S350'). If none of the keys is triggered during the predetermined time (step S340') or the turn-off key is triggered (step S350'), the electronic calculator is controlled to enter the turned-off state (step S360'). Contrarily, if at least one of the keys is triggered during the predetermined time (step S340') and the turn-off key is not triggered (step S350'), step S330' is executed again.

Additionally, the control methods illustrated in FIGS. 3-5 can be well understood by referring to descriptions related to FIG. 1 and FIG. 2 therefore will not be further described herein.

As described above, an electronic calculator and a control method thereof are provided by embodiments of the present invention. A turn-on key of the electronic calculator has two different hardware configurations, and a processing chip can start two different operation modes in which an operation information stored before the electronic calculator is turned off is respectively kept and cleared according to the hardware configuration of the turn-on key. Because two different operation modes of the electronic calculator can be accomplished without changing the processing chip but by simply changing the hardware configuration of the turn-on key, a designer can quickly design an electronic calculator offering a memory saving mode or a memory clearing mode according to the requirement of the product specification, so that the manufacturing of electronic calculators is made very convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic calculator, comprising:
a display module;
a key array, comprising a plurality of keys, wherein the keys at least comprise an turn-on key, and the turn-on key has a first hardware configuration and a second hardware configuration; and
a processing chip, coupled to the display module and the key array, and configured to detect whether the keys are triggered to execute corresponding calculation functions and control image display of the display module,
wherein the electronic calculator enters a turned-on state in response to the triggering of the turn-on key,
wherein if the turn-on key is set to the first hardware configuration, the processing chip controls the electronic calculator to keep an operation information stored before the electronic calculator is turned off when the turn-on key is triggered,
wherein if the turn-on key is set to the second hardware configuration, the processing chip controls the electronic calculator to clear the operation information stored before the electronic calculator is turned off when the turn-on key is triggered.

2. The electronic calculator according to claim 1, wherein the key array comprises:
a circuit board, having a plurality of key areas arranged into an array, a plurality of input ports, and a plurality of output ports, wherein each row of the key areas are coupled to the processing chip through the corresponding input ports, each column of the key areas are coupled to the processing chip through the corresponding output ports, the key areas at least comprise a first key area and a second key area, both the first key area and the second key area are corresponding to the turn-on key, and the other key areas are respectively corresponding to the other keys.

3. The electronic calculator according to claim 2, wherein if the turn-on key is configured to electrically connect the input port and the output port corresponding to the first key area and electrically separate the input port and the output port corresponding to the second key area when the turn-on key is triggered, a hardware configuration of the turn-on key is defined to be the first hardware configuration.

4. The electronic calculator according to claim 2, wherein when the turn-on key is configured to electrically separate the input port and the output port corresponding to the first key area and electrically connect the input port and the output port corresponding to the second key area when the turn-on key is triggered, a hardware configuration of the turn-on key is defined to be the second hardware configuration.

5. The electronic calculator according to claim 1, wherein the keys further comprise at least one storage function key, and when the at least one storage function key is triggered in the turned-on state, the processing chip controls the electronic calculator to store the operation information.

6. The electronic calculator according to claim 1, wherein when the processing chip detects that the keys are not triggered during a predetermined time, the processing chip turns off the electronic calculator.

7. The electronic calculator according to claim 1, wherein the keys further comprises a turn-off key, and when the turn-off key is triggered in the turned-on state, the processing chip turns off the electronic calculator.

8. A control method of an electronic calculator, wherein the electronic calculator comprises a key array having a plurality of keys and a display module, the keys at least comprise a turn-on key, and the control method comprises:
   setting the turn-on key to a first hardware configuration or a second hardware configuration;
   detecting whether the turn-on key is triggered;
   if the turn-on key is set to the first hardware configuration, controlling the electronic calculator to enter a turned-on state and keeping an operation information stored before the electronic calculator is turned off when the turn-on key is triggered;
   if the turn-on key is set to the second hardware configuration, controlling the electronic calculator to enter the turned-on state and clearing the operation information stored before the electronic calculator is turned off when the turn-on key is triggered; and
   in the turned-on state, executing corresponding calculation functions and controlling image display of the display module in response to the triggering of the keys.

9. The control method according to claim 8, wherein the key array comprises a circuit board having a plurality of key areas arranged into an array, a plurality of input ports, and a plurality of output ports, the input ports are respectively corresponding to each row of the key areas, the output ports are respectively corresponding to each column of the key areas, the key areas at least comprise a first key area and a second key area, both the first key area and the second key area are corresponding to the turn-on key, and the other key areas are respectively corresponding to the other keys, wherein the step of setting the turn-on key to the first hardware configuration comprises:
   electrically connecting the input port and the output port corresponding to the first key area when the turn-on key is triggered; and
   electrically separating the input port and the output port corresponding to the second key area when the turn-on key is triggered.

10. The control method according to claim 8, wherein the step of setting the turn-on key to the second hardware configuration comprises:
    electrically separating the input port and the output port corresponding to the first key area when the turn-on key is triggered; and
    electrically connecting the input port and the output port corresponding to the second key area when the turn-on key is triggered.

11. The control method according to claim 8, wherein the keys further comprise at least one storage function key, and the step of in the turned-on state, executing the corresponding calculation functions and controlling the image display of the display module in response to the triggering of the keys comprises:
    storing the operation information in response to the triggering of the at least one storage function key.

12. The control method according to claim 8, further comprising:
    detecting whether at least one of the keys is triggered during a predetermined time; and
    if the keys are not triggered during the predetermined time, turning off the electronic calculator.

13. The control method according to claim 8, wherein the keys further comprise a turn-off key, and the control method further comprises:
    detecting whether the turn-off key is triggered; and
    if the turn-off key is triggered, turning off the electronic calculator.

* * * * *